Figure 1:
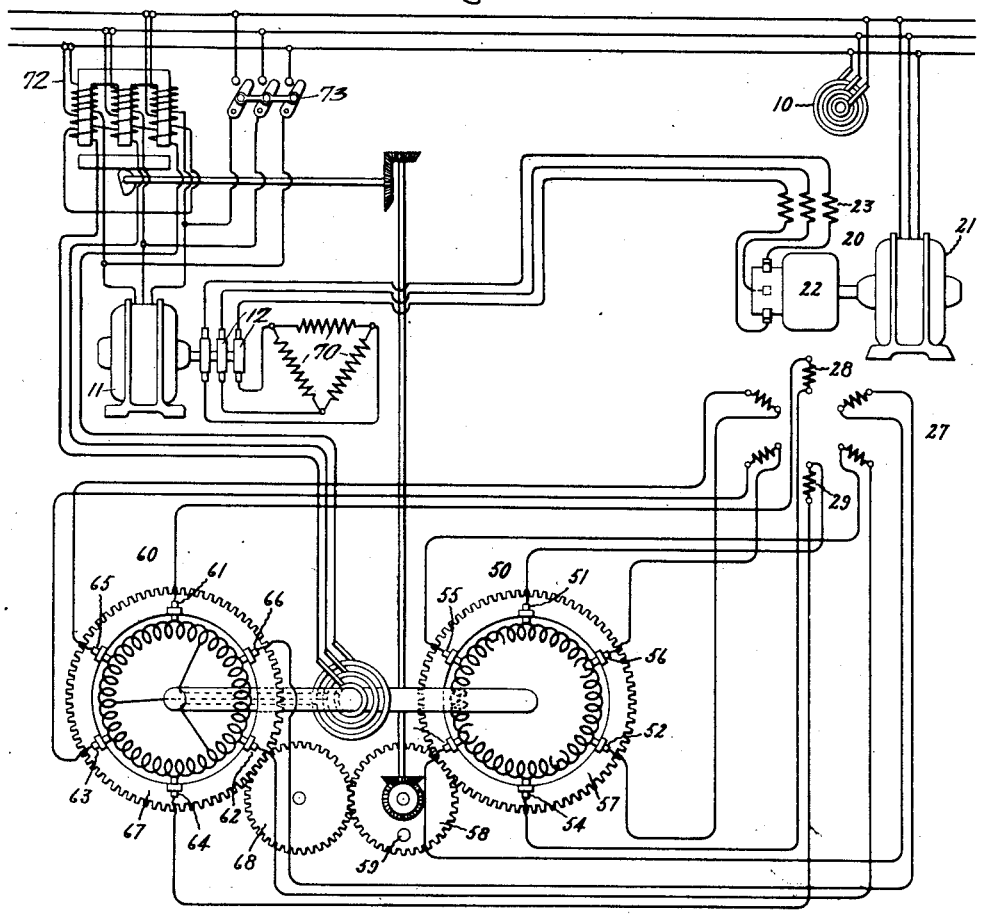

W. C. KORTHALS-ALTES.
INDUCTION MOTOR CONTROL.
APPLICATION FILED MAY 18, 1916.

1,301,710.

Patented Apr. 22, 1919.
2 SHEETS—SHEET 1.

Inventor:
Willem C. Korthals-Altes,
by
His Attorney.

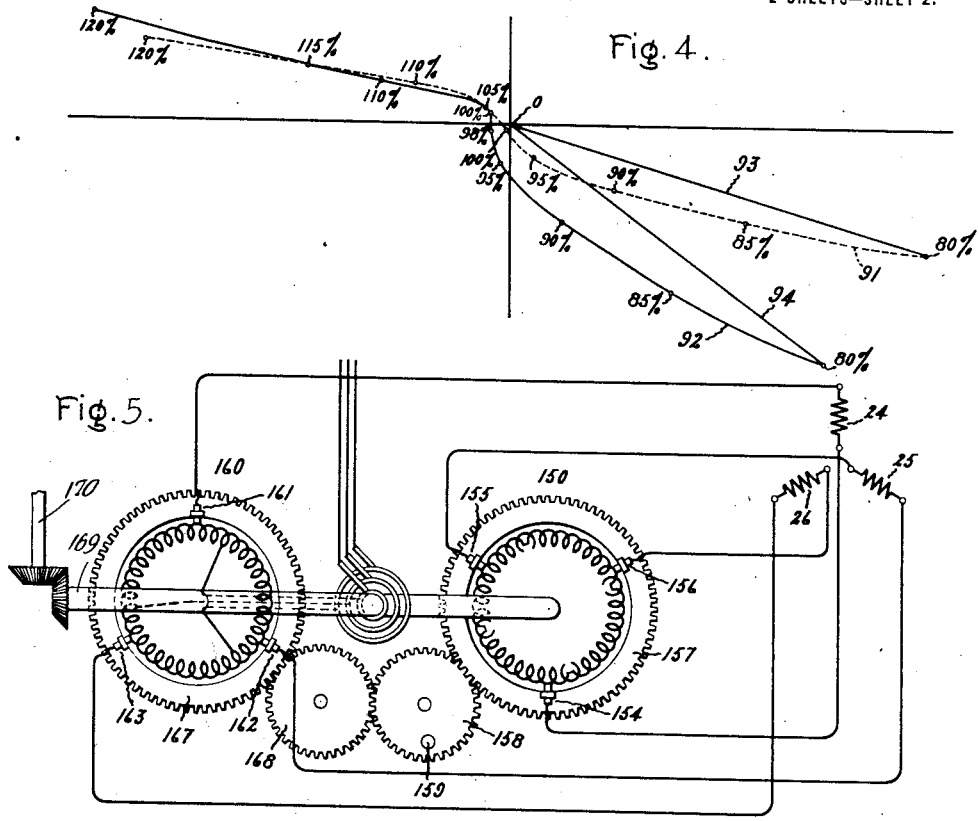
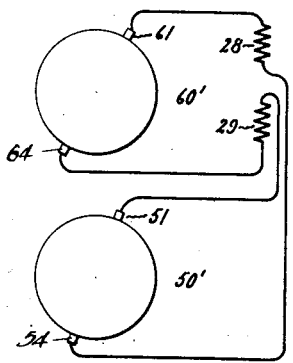
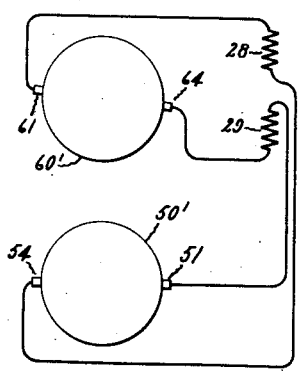
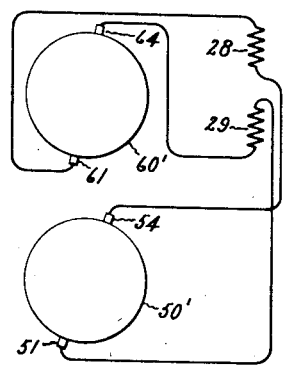

UNITED STATES PATENT OFFICE.

WILLEM C. KORTHALS-ALTES, OF SCHENECTADY, NEW YORK, ASSIGNOR TO GENERAL ELECTRIC COMPANY, A CORPORATION OF NEW YORK.

INDUCTION-MOTOR CONTROL.

1,301,710.   Specification of Letters Patent.   Patented Apr. 22, 1919.

Application filed May 18, 1916. Serial No. 98,430.

*To all whom it may concern:*

Be it known that I, WILLEM C. KORTHALS-ALTES, a subject of the Queen of the Netherlands, residing at Schenectady, in the county of Schenectady, State of New York, have invented certain new and useful Improvements in Induction-Motor Controls, of which the following is a specification.

My invention relates to the control of induction motors, and especially to that form of control in which a commutator machine is concatenated with the secondary winding of the induction motor.

In induction motor control systems of the kind to which my invention relates it is essential for the most satisfactory operation that the commutating machine be excited by voltages having the same frequency as the voltages induced in the secondary winding of the induction motor and that as the voltages by which the commutator machine is excited are varied to cause a variation in the speed of the induction motor the phase thereof shall be varied. Furthermore, when varying the speed of the induction motor through synchronism it is important that the commutator machine be excited by voltages having the proper magnitude and phase to cause it to supply the magnetizing current for the induction motor. Preferably also the magnitude and phase of the voltages by which the commutator machine is excited should vary as the load on the induction motor varies.

An object of my invention is, therefore, to provide a system of the kind to which my invention relates wherein the commutator machine will be excited by voltages, the frequency and phase of which shall vary in the proper manner as the magnitude thereof is varied to vary the speed of the induction motor, and wherein the commutator machine will be excited by voltages having the proper magnitude, frequency and phase to cause it to supply the magnetizing current for the induction motor when the speed thereof is varied through synchronism.

Another object of my invention is to provide a system wherein the magnitude and phase of the voltages by which the commutator machine is excited shall vary with the load upon the induction motor.

Other objects of my invention will appear as this specification proceeds.

In accordance with my invention I excite the commutator machine from a frequency changer adapted to deliver voltages having the same frequency as the voltages induced in the secondary winding of the induction motor and provide means for varying simultaneously the magnitude and phase of the voltages delivered by the frequency changer. I also design and construct the frequency changer so that it will maintain a voltage upon the exciting windings of the commutator machine at all times, thereby causing the commutator machine to maintain a voltage upon the secondary of the induction motor and to supply the magnetizing current for the induction motor when the speed thereof is varied through synchronism. I also provide means responsive to the load upon the induction motor for controlling the magnitude and phase of the voltage supplied to the frequency changer and hence the magnitude and phase of the voltage delivered by the frequency changer to the exciting winding of the commutator machine.

Figure 2:
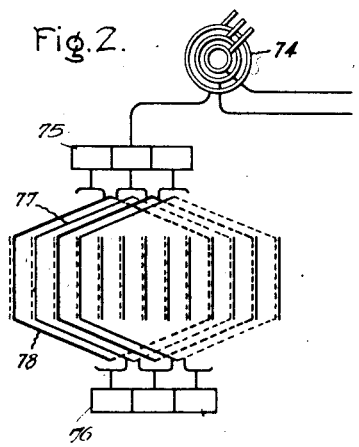
Figure 3:
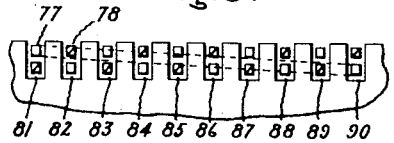

My invention will be more readily understood by reference to the following specification taken in connection with the accompanying drawing, in which Figure 1 shows my invention embodied in a system comprising a three-phase induction motor; Fig. 2 is a diagram showing one arrangement of armature coils in a double frequency changer of the type illustrated in Fig. 1; Fig. 3 shows diagrammatically how these coils may be arranged in the slots of the armature core; Fig. 4 is a diagram of explanatory curves; Fig. 5 shows an embodiment of my invention similar to that shown in Fig. 1, the only difference being that the frequency changer is adapted to be mechanically driven from the induction motor and the exciting windings of the commutator machine are three-phase instead of six-phase; and Figs. 6, 7 and 8 are explanatory diagrams.

Referring to Fig. 1, 10 represents a polyphase source of supply from which the primary winding of the induction motor 11 is energized. The secondary winding of this motor is here shown as mounted on the rotor and as provided with slip rings 12. For regulating the speed of the induction motor, I employ a regulating set comprising a commutator machine 20, mechanically connected to an induction motor generator 21, which has its primary winding connected to the source of supply. This commutator machine 20 comprises a commuted winding 22, concatenated with the secondary winding of the motor 11 through the compensating windings 23, and the exciting winding 27. Although I have illustrated my invention as applied to that arrangement wherein the commutator machine is mechanically separate from the induction motor, it will be understoood that it is equally applicable to the arrangement wherein the commutator machine is mechanically connected to the induction motor. The electrical connections of the commutator machine are moreover, identical in either case. The exciting winding 27 is connected to a double frequency changer having windings 50 and 60 mounted to rotate in unison and a winding 70 which is connected to the slip rings 12 of the induction motor 11 and which is, therefore, excited by voltages, the magnitude and frequency of which vary inversely as the speed of the induction motor. The windings 60 and 70 coöperate to rotate the windings 50 and 60 at a speed proportional to that of the induction motor so that the frequency of the voltages impressed upon the exciting windings 27 is equal to the frequency of the voltages at the slip rings 12. Preferably, the winding 70 of the frequency changer is designed with such a number of turns that, with the frequency changer at standstill and the voltage of the source of supply applied to its slip rings, the voltage induced at the terminals in the winding 70 by transformation is the same as that induced at the terminals of the secondary winding of the induction motor when the same is held at standstill and the voltage of the source of supply is applied to its primary winding. With this design there will be no tendency for the frequency changer to supply current to the secondary of the induction motor. Each part of this frequency changer comprises a commuted armature winding of which one has equispaced points connected through slip rings to the source of supply. These windings may be wound upon separate cores mounted to rotate in unison, but preferably they will be arranged upon the same core. If so wound, the two windings will preferably be arranged in the manner illustrated in Figs. 2 and 3. In Fig. 2, I have shown a few segments of two commutators 75 and 76. One winding 77 is connected to the commutator 75 while the other winding 78 is connected to the commutator 76. The polyphase source of supply 10 is connected through the secondary windings of a transformer 72, the primary of which is interposed between the source of supply 10 and induction motor 11 and adapted to be short circuited by means of switch 73, to the slip rings 74 which are connected to equispaced points of the winding 77. In Fig. 3 I have indicated diagrammatically the arrangement of a portion of the two windings in slots 81 to 90 and from an inspection of this figure it will be seen that each coil is arranged in an odd and an even numbered slot with the result that one side of a coil of the winding 77, as indicated by the open squares, will always occupy a slot with one side of a coil of the winding 78, as indicated by the crossed squares. Because of this inductive relation of the two windings, the slip rings 74 only need to be connected to one winding. Whatever arrangement of the armature windings is employed, the commutator of winding 50 will be provided with brushes 51 to 56 mounted upon a single brush yoke 57 by means of which they may be rotated around the commutator with a fixed space relation. Similarly the commutator of winding 60 is provided with brushes 61 to 66 mounted upon a yoke 67. Some means, such as the gears 58 and 68 diagrammatically shown as meshing with one another and with teeth upon the yokes 57 and 67, is provided for the purpose of definitely controlling the relative positions of the brushes on the two commutators. The gear 58 may be rotated by means of a handle 59 and is designed with a slightly smaller number of teeth than the gear 68 so that the yoke 57 will be rotated faster than the yoke 67. For example, in one particular design, I have found that the gear ratio between gears 58 and 68 should be as 18 is to 19. Obviously the figure is only diagrammatic, since the yokes 57 and 67 will be in parallel planes but it is believed that the equivalent mechanical construction will be at once evident to one skilled in the art. I have shown the frequency changer in this figure as a six-phase machine for the reason that this is a particularly advantageous design in cases where the frequency of the source of supply 10 is twenty-five cycles per second. This results from the fact that the same brush yokes may be employed for a six-phase, twenty-five cycle frequency changer of one number of poles as for a three-phase, sixty cycle machine of twice the number of poles and of approximately the same speed, with a resulting reduction in the number of necessary designs. I find, moreover, that it is possible, with a twenty-five cycle machine, to obtain approximately twice as great an output of exciting kilovolt amperes as with the corresponding sixty-cycle machine, because I am able to provide twice as many brush studs per pole upon a commutator of the same dimensions. If the commutator machine of the regulating set have an even number of pairs of poles then the exciting winding 27 may be connected up, as shown, with two circuits per phase, which have an equal number of turns. For example, the coil 28 is connected between brushes 61 and 54 while the coil 29 is connected between the brushes 51 and 64. If a regulating commutating machine be used which does not have an even number of pairs of poles, the exciting winding should be equipped with double coils so that there will be two circuits which have the same number of turns, as in the case with coils 28 and 29. Except for the effect of the series transformer 72, a constant voltage will be impressed upon the winding 60 of the double frequency changer and the voltages between diametrically opposed brushes associated with the respective windings 50 and 60 will always remain constant. The voltage impressed upon the exciting windings, as for example, windings 28 and 29 constituting individual phases of the exciting windings 27, may be varied in magnitude and phase by the operation of the handle 59 which effects the rotating of the brush yokes 57 and 67 in opposite directions and at different speeds since said windings receive a voltage which is the vector sum of the voltages produced between corresponding brushes on the two commutators. The exciting windings 28 and 29, for example, are connected to each receive its proportionate part of the vector sum of the voltages generated between brushes 51 and 54 and between brushes 61 and 64. Similar connections are provided for the other windings. The winding 50 will be designed to supply a slightly smaller voltage than the winding 60. One manner of readily effecting this result will be to leave a few of the coils of the winding 50 dead, as indicated, and then to provide a commutator having a few less bars than that for the winding 60.

The yokes 57 and 67 may be rotated by manipulation of the handle 59. This will, because of the differences in voltage of the two windings, and the difference in the speed of rotation of the two yokes, result in varying the magnitude and phase of the voltage applied to the exciting windings 27.

Because of the difference in the voltage between coresponding pairs of brushes on the respective yokes 57 and 67 at least a small residual voltage will always be maintained on the exciting windings 27 for power factor correction even though no voltage is required for speed regulation.

For the sake of more definitely pointing out the operation of one possible arrangement by means of which my conception may be actually put into practice, I have drawn in Fig. 4 a curve 91 which is the locus of the vectors representing the voltages to be applied to the exciting windings of the commutator machines at different speed settings, indicated as percentages of synchronous speed, of the main motor with no load thereon, for that arrangement where the frequency changer is to cause the commutator machine to supply the magnetizing current required for exciting the main induction motor so that the same will run at unity power factor. Similarly the curve 92 represents the conditions where the motor is running under full load at unity power factor. A vector drawn between the origin (the crossing point of the axes) and any point of the dotted curve 91 will represent the time-phase, sense, and value of the voltage required for exciting the commutator machine for some particular speed of the main induction motor. I have drawn such a vector 93 for the condition obtaining when the main motor is running at 80% of synchronous speed and unloaded. I have also drawn a vector 94 representing these same conditions when the motor is running at the same speed fully loaded. It will, therefore, be seen that I have definitely ascertained the voltage which must be applied to the field of the commutator machine for all speeds and all conditions. It will, furthermore, be seen that by properly regulating the phase of the voltages which are supplied from the two windings of the double changer, I may obtain a resultant voltage which will have the time-phase, sense, and magnitude required. Inasmuch as this voltage varies according to a definite law, it will be evident that the apparatus provided and shown in Fig. 1 may be designed to so move the brush yokes on the two commutators that the resultant voltage obtained will vary with this law.

In Figs. 6, 7, and 8, I have shown diagrammatically two commutators 50' and 60', and the brushes by means of which the coils 28 and 29 of the exciting winding of the commutator machine are supplied. The brushes in the position shown in Fig. 6 are so arranged that the vector sum of the voltages delivered will give the desired excitation for 80% of synchronous speed, it being noted that these voltages are nearly in phase. The position of the brushes in Fig. 7 will correspond to a medium speed which is near the synchronous speed, for the reason that the phase of the two voltages is nearly opposite so that their vector sum is very small. Owing to the difference in the voltages supplied by the two commutators, however, this sum can never equal zero and, therefore, a voltage of the correct phase and magnitude will be supplied, to cause the commutator machine to supply the magnetizing current for the main induction motor, with the result that the power factor of the motor will be corrected and brought to unity. Further movement of the operating handle will cause the brush yokes to bring the brushes into the position illustrated in Fig. 8. The illustration of Fig. 8 corresponds to the maximum speed obtainable with the apparatus in question, for the reason that the voltages delivered by the commutators 50' and 60' are again brought approximately into phase but with their vector sum displaced approximately 180° from the sum in Fig. 6. This corresponds approximately with a vector drawn to the point marked 120% on curve 91.

It will be seen that this arrangement of the operating handle for the yokes of the frequency changer does not take into account the changes in excitation required to compensate for a variation in load. I have, however, shown a series transformer whose primary winding is interposed between the supply mains and the primary winding of the main induction motor so that it carries the load current. The secondary winding of this series transformer is subdivided and so connected that each phase of the primary winding has associated with it the windings in two phases of the secondary. As a consequence, a resultant voltage of the correct phase and magnitude, dependent upon the design of the series transformer, will be supplied to the slip rings of the frequency changers, so that with variations in load on the main induction motor, the voltage applied to the exciting windings of the commutator machine will be automatically shifted at 80% of synchronous speed, for example, from the phase of the vector 93 to that of the vector 94 shown in Fig. 4. By proper design of this transformer the magnitude as well as the phase may be varied and any desired amount of speed drop between no load and full load may be obtained. It will be noted that this series transformer may be provided with an adjustable air gap, which may, if desired, be varied to suit any particular speed setting, coincidently with movement of the handle 59. Whether the air gap of the transformer should be increased or decreased or whether it should be maintained constant as the handle 59 is moved to increase the speed of the induction motor below synchronism depends upon the design of the apparatus. In Fig. 1 means are illustrated for decreasing the air gap of the transformer as the handle 59 is moved to increase the speed of the induction motor below synchronism and to maintain the air gap constant as the handle 59 is moved to increase the speed above synchronism. If desired, the series transformer may be short-circuited by means of the switch 73 when operating above synchronous speed.

Thus the speed of the induction motor 11 may be varied through sub-synchronism, synchronism and super-synchronism values by the operation of the handle 59 by means of which voltages of the proper frequency, magnitude and phase to cause the motor 11 to operate at all speeds and loads with the desired power factor are caused to be impressed upon the exciting windings of the commutator machine 22.

In Fig. 5, I have shown how my arrangement for speed control and power factor correction, illustrated in Fig. 1 for six phases, may equally well be applied with a double frequency changer having commuted windings 150 and 160 connected to three phase exciting windings 24, 25 and 26. The commutator for winding 150 has brushes 154, 155 and 156 mounted on a yoke 157 while the commutator for winding 160 has brushes, 161, 162 and 163 mounted on a yoke 167. The yokes are rotated, as in Fig. 1, by means of intermeshing gears 168 and 158, the latter of which is provided with a handle 159. The remaining connections are the same as in Fig. 1. The frequency changer shown in Fig. 5 may be coupled to and driven by the induction motor by means of the geared shafts 169 and 170 and such a drive may also, if desired, be substituted for the electrical drive in Fig. 1.

Although I have herein shown certain specific embodiments of my invention, as applied to three-phase and six-phase arrangements, it will be understood that various modifications and changes may be made and the invention utilized with any number of phases without departing from the true scope of the invention as expressed in the appended claims.

What I claim as new and desire to secure by Letters Patent of the United States, is:

1. In combination, a source of supply, an induction motor connected thereto, and means for causing the speed of said induction motor to vary over a range including synchronous speed and for maintaining a voltage on the secondary of said induction motor at all speeds, said means comprising a dynamo-electric commutator machine having a commuted winding connected to the secondary winding of said induction motor and an exciting winding, a frequency changer provided with two mutual inductively connected armature windings, one of said windings having a smaller number of turns than the other winding, means for connecting one of said armature windings to said source of supply, means for connecting said exciting winding in series with portions of each armature winding, and means for varying the portions of each armature winding to which said exciting winding is connected.

2. In combination, a source of supply, an induction motor connected thereto, and means for causing the speed of said induction motor to vary over a range including synchronous speed and for maintaining a voltage on the secondary of said induction motor at all speeds, said means comprising a dynamo-electric commutator machine having a commuted winding connected to the secondary winding of said induction motor and an exciting winding, a frequency changer provided with two mutual inductively connected armature windings, one of said windings having a smaller number of turns than the other winding, means for connecting one of said armature windings to said source of supply, means for connecting said exciting winding in series with portions of each armature winding, and means for causing said frequency changer to rotate at a speed proportional to the speed of the induction motor.

3. In combination, a source of supply, an induction motor connected thereto, and means for causing the speed of said induction motor to vary over a range including synchronous speed and for maintaining a voltage on the secondary of said induction motor at all speeds, said means comprising a dynamo-electric commutator machine having a commuted winding connected to the secondary winding of said induction motor and an exciting winding, a frequency changer provided with two mutual inductively connected armature windings, one of said windings having a smaller number of turns than the other winding, means for connecting one of said armature windings to said source of supply, a commutator for each of said armature windings, a set of brushes for each commutator, means for connecting said exciting winding to receive the vector sum of the voltages produced between corresponding brushes on said commutators, and means for varying the position of said sets of brushes on said commutators.

4. In combination, a source of supply, an induction motor connected thereto, and means for causing the speed of said induction motor to vary over a range including synchronous speed and for maintaining a voltage on the secondary of said induction motor at all speeds, said means comprising a dynamo-electric commutator machine having a commuted winding connected to the secondary winding of said induction motor and an exciting winding, a frequency changer provided with two mutual inductively connected armature windings, one of said windings having a smaller number of turns than the other winding, means for connecting one of said armature windings to said source of supply, a commutator for each of said armature windings, a set of brushes for each commutator, means for connecting said exciting winding to receive the vector sum of the voltages provided between corresponding brushes on said commutators, means for varying the position of said sets of brushes on said commutators, and means for causing said frequency changer to rotate at a speed proportional to the speed of the induction motor.

5. In combination, a source of supply, an induction motor connected thereto, a commutator machine concatenated with said motor and provided with an exciting winding, a frequency changer provided with movable brushes, means for supplying current to said frequency changer from said source of supply, means for connecting said brushes to said exciting winding, and means responsive to the load upon said motor controlling the voltage applied to said exciting winding.

6. In combination, a source of supply, an induction motor connected thereto, a commutator machine concatenated with said motor and provided with an exciting winding, a frequency changer provided with movable brushes, means for supplying current to said frequency changer from said source of supply, means for connecting said brushes to said exciting winding, and means responsive to the load upon said motor for varying the voltage supplied to said frequency changer.

7. In combination, a source of supply, an induction motor connected thereto, a commutator machine concatenated with said motor and provided with an exciting winding, a frequency changer provided with movable brushes, means for supplying current to said frequency changer from said source of supply, means for connecting said brushes to said exciting winding, and means responsive to the load upon said motor for varying the phase of the voltage supplied to said frequency changer.

8. In combination, a source of supply, an induction motor connected thereto, a commutator machine concatenated with said motor and provided with an exciting winding, a frequency changer provided with two sets of movable brushes, means for supplying current to said frequency changer from said source of supply, means for connecting said brushes to said exciting windings, a series transformer having its primary winding in series with said induction motor primary and its secondary winding in series with the connection between said source and said frequency changer, and means comprising said movable brushes for varying both the magnitude and phase of the voltage applied to said exciting windings.

9. In combination, a source of supply, an induction motor connected thereto, a commutator machine concatenated with said motor and provided with an exciting winding, the frequency changer being provided with two sets of movable brushes, means for supplying current to said frequency changer from said source of supply, means for connecting said brushes to said exciting winding, a series transformer having a variable air gap and having its primary windings in series with said induction motor and its secondary winding in series with the connection between said source and said frequency changer, means comprising said movable brushes for varying the magnitude and phase of the voltage applied to said exciting windings, and means operable simultaneously with the operation of the means for varying the magnitude and phase of the voltage applied to said exciting windings for varying the air gap of said transformer.

In witness whereof, I have hereunto set my hand this 17th day of May, 1916.

WILLEM C. KORTHALS-ALTES.